United States Patent
Pohl et al.

(10) Patent No.: US 6,378,558 B1
(45) Date of Patent: Apr. 30, 2002

(54) VALVE ON THE BASIS OF ELECTRORHEOLOGICAL AND/OR MAGNETORHEOLOGICAL FLUIDS

(75) Inventors: Andreas Pohl, Gross-Umstadt; Horst Rosenfeldt, Gross-Zimmern; Eckhardt Wendt, Leverkusen; Klaus Buesing, Cologne, all of (DE)

(73) Assignee: Carl Schenck, Darmstadt (DE)

( * ) Notice: Subject to any disclaimer, the term of this patent is extended or adjusted under 35 U.S.C. 154(b) by 0 days.

(21) Appl. No.: 09/700,096

(22) PCT Filed: May 6, 1999

(86) PCT No.: PCT/EP99/03125

§ 371 Date: Nov. 8, 2000

§ 102(e) Date: Nov. 8, 2000

(87) PCT Pub. No.: WO99/58874

PCT Pub. Date: Nov. 18, 1999

(30) Foreign Application Priority Data

May 8, 1998 (DE) .......................... 198 20 569

(51) Int. Cl.[7] ............................. F15B 21/00
(52) U.S. Cl. ................ 137/827; 137/807; 251/126; 251/127
(58) Field of Search .................. 137/807, 827; 251/126, 127

(56) References Cited

U.S. PATENT DOCUMENTS

| | | |
|---|---|---|
| 2,661,596 A | 12/1953 | Winslow |
| 4,880,216 A | * 11/1989 | Hartel et al. ............ 267/140.14 |
| 4,898,084 A | * 2/1990 | Oppermann et al. ........ 73/118.1 |
| 5,353,839 A | * 10/1994 | Kordonsky et al. ......... 137/806 |
| 6,158,470 A | * 12/2000 | Ivers et al. ................. 137/807 |

FOREIGN PATENT DOCUMENTS

| | | |
|---|---|---|
| DE | 3808521 | 4/1989 |
| DE | 4333871 | 4/1995 |
| DE | 19717704 | 10/1998 |
| EP | 0460808 | 12/1991 |
| EP | 0673478 | 9/1995 |
| EP | 0-898093 | 2/1999 |
| GB | 1282568 | 7/1972 |
| GB | 2193785 | 2/1988 |
| WO | WO99/27273 | 6/1999 |

OTHER PUBLICATIONS

"Technical Application of New Actuators"("Technischer Einsatz neuer aktoren"), published by Expert–Verlag, Renningen–Meinsheim, 1995, Chapter 3.2.1. and Fig. 3.1.

"Applications of the Electrorheological Effects in Engineering Practice", by Gorodkin et al.; FLUID MECHANICS, Soviet Research, vol. 8, No. 4, Jul.–Aug., 1979, pp. 48–16.

* cited by examiner

Primary Examiner—A. Michael Chambers
(74) Attorney, Agent, or Firm—W. F. Fasse; W. G. Fasse

(57) ABSTRACT

A valve (1) on the basis of electrorheological and/or magnetorheological fluids includes a fluid inlet channel (3) connected through a valve gap (5) to a fluid outlet channel (4). The valve gap is filled with an electrorheological and/or magnetorheological fluid and is bounded by bounding surfaces that are embodied as electrically energizable capacitor electrodes and/or coil arrangements, whereby the field excitation thereof acts on the fluid flowing through the valve gap. At least one bounding surface of the valve gap is embodied to be movable selectively toward and away from another bounding surface, so as to superimpose a squeeze mode and a flow mode of the electrorheological and/or magnetorheological effect. The valve gap may define a meandering or spiral flow path for the fluid. In this manner, a compact valve can provide high blocking pressures and high through-flow rates.

21 Claims, 5 Drawing Sheets

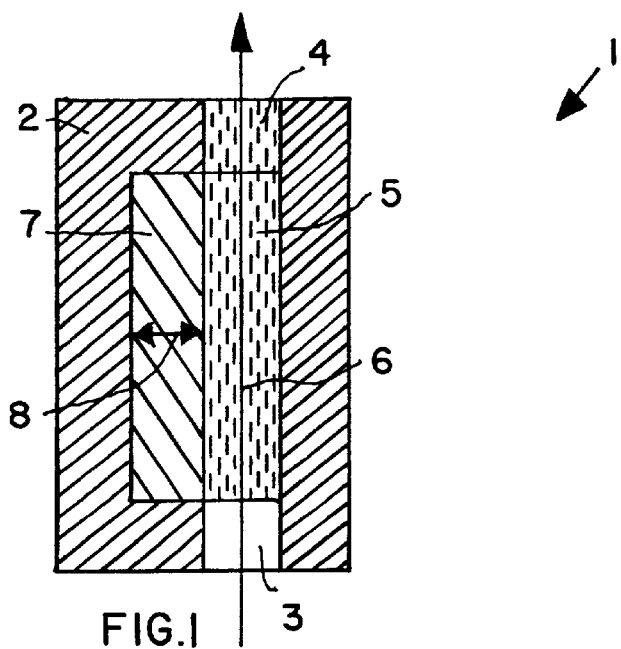
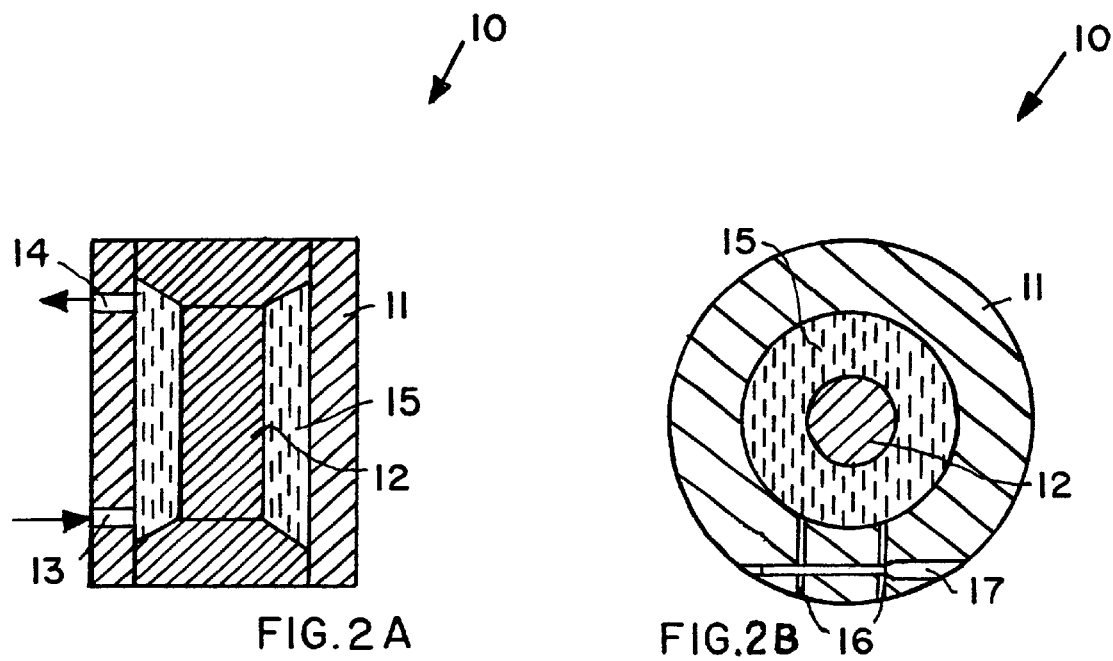

VALVE ON THE BASIS OF ELECTRORHEOLOGICAL AND/OR MAGNETORHEOLOGICAL FLUIDS

FIELD OF THE INVENTION

The invention relates to electrorheological and magnetorheological valves.

BACKGROUND INFORMATION

Valves for electrorheological fluids are generally built of coaxial cylinder electrodes or of arrangements of parallel plates, between which the electrorheological fluid flows through. Due to an electric voltage applied to the electrodes, the viscosity of the electrorheological fluid located between the electrodes and therewith the through-flow resistance through the valve gap are controllable.

In comparison to conventionally controllable valves, electrorheological fluid valves are more simply constructed, because they include no moved mechanical parts such as closing or blocking bodies. A further advantage is that electrical signals can be directly transformed so that fast switching times can be realized with electrorheological fluid valves. Such valves are especially used in active shock absorbers and damping bearings, for example see U.S. Pat. Nos. 2,661,596, 4,880,216, EP 0,673,678 B1. In this context, active means that the damping behavior of such shock absorbers and bearings can be controlled by means of motion sensors on the basis of the instantaneously prevailing motion condition, by varying the electric field generated between the capacitor plates forming the valve gap.

Electrorheological fluids or magnetorheological fluids are fluids of which the rheological characteristics are controllable in a continuous or step-less manner via the electric or magnetic field. Generally, electrorheological fluids or magnetorheological fluids are suspensions, i.e. solid particles suspended in a carrier medium, which particles are polarizable by means of the electric or magnetic field. The reciprocal interaction between the electrode arrangement and the electrorheological fluid can be differentiated among three basic modes depending on the type of the fluid deformation, namely the shear mode (electrodes slide relative to one another in parallel planes), the flow mode (electrodes are rigidly or fixedly arranged and the fluid flows through between the electrodes), and the squeeze mode (electrodes vary their spacing distance relative to each other). These modes can also arise in combination. Further details in this context are found in the book "Technical Application of New Actuators"("Technischer Einsatz neuer Aktoren", published by Expert-Verlag, Renningen-Meinsheim, 1995, Chapter 3.2.1 and FIG. 3.1.

SUMMARY OF THE INVENTION

The object of the present invention is to provide a valve that utilizes the advantages of using electrorheological fluids and/or magnetorheological fluids as a hydraulic medium, that can be used in a variety of applications, and that can realize high pressures and through-flow rates. This object is achieved in that at least one bounding surface of the valve gap is embodied so as to be movable.

In the inventive valve, first the capacitor fields formed by the bounding surfaces are actuated or energized in such a manner that an electrorheological fluid flowing through the valve gap will become solidified in the valve gap and will close or block the valve gap. In this solidification, the solid particles orient themselves into chains. The solidified locations behave in the manner of elastic solid bodies. In order to increase the blocking pressure in the valve gap, a bounding surface of the valve gap is embodied to be movable according to the invention. The volume in the valve gap is thereby reduced, and as a result the electrorheological fluid is additionally transitioned into the squeeze mode. Between the solid particles that have oriented themselves into chains, electrostatic counterforces will now be effective due to the sliding displacement of the bounding surface or surfaces of the valve gap. In comparison to the flow mode acting by itself, therefore, a solidified electrorheological fluid plug acting as a blockage or closure in the combined flow mode and squeeze mode can build up a multiply higher pressure, before the fluid plug will be pushed further through the valve gap due to the pressure.

The above object of the invention can alternatively or additionally be achieved in that the electrorheological fluid flows through the valve gap in a meandering pattern or in a helical or spiral pattern. Due to the inventive configuration, a long valve gap can be achieved despite a small structural length of the overall valve, so that high pressures can be controlled by such a valve.

BRIEF DESCRIPTION OF THE DRAWINGS

In the following, example embodiments of the invention will be discussed in greater detail, which are shown in the drawings, wherein:

FIG. 1 shows an electrorheological valve with a rectangular cross-section in a sectional view;

FIG. 2A shows a cylindrically embodied electrorheological valve in a lengthwise section;

FIG. 2B shows the valve according to FIG. 2A in a cross-section;

Figure 3:
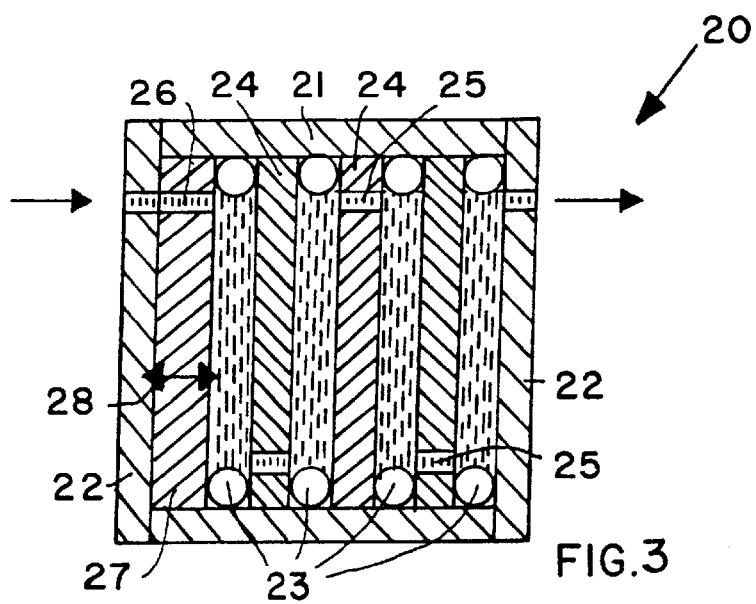
FIG. 3 shows a further example embodiment of an electrorheological valve with disk-shaped elements in a cross-sectional view.

DETAILED DESCRIPTION OF PREFERRED EXAMPLE EMBODIMENTS AND OF THE BEST MODE OF THE INVENTION

In a sectional view, FIG. 1 shows an electrorheological valve 1, that comprises a valve housing 2, which has therein a fluid inlet channel 3 and a fluid outlet channel 4. The valve gap 5, through which the electrorheological fluid flows from the fluid inlet channel 3 to the fluid outlet channel 4, is bounded by two parallel capacitor plates or electrodes arranged spaced apart from each other with the valve gap 5 therebetween. The capacitor electrodes are formed on the one hand by the valve housing 2, which is connected by electrical lines to a regulatable high voltage source, and on the other hand by a plate-shaped actuator 7 that is movably supported in the valve housing 2 so as to be movable perpendicular to the through-flow direction (shown by arrow 6) of the electrorheological fluid through the valve gap 5.

The actuator 7 is connected to ground potential via an insulated line that leads out of the valve housing 2. The electrical lines as well as the control device and the like have been omitted from the illustration. The movement direction of the actuator 7 is indicated by the arrow 8, whereby the actuator 7 can be controlledly activated according to piezoelectric, magnetic, hydraulic or magnetostrictive principles. The actuating control is not shown in detail in the drawing.

In the inventive valve 1, the capacitor fields formed between the actuator 7 and the valve housing 2 are first controlledly actuated or energized in such a manner to achieve a flow mode electrorheological effect, namely so that an electrorheological fluid flowing in the direction of the arrow 6 from the fluid inlet channel 3 to the fluid outlet channel 4 through the valve gap 5 will become solidified in the valve gap 5 and thereby close or block the valve gap 5. In order to increase the blocking pressure of the solidified fluid in the valve gap 5, the actuator 7 is embodied to be movable in the direction of the arrow 8. Thereby, the volume in the valve gap 5 is reduced, and as a result the electrorheological fluid is now additionally transitioned into the squeeze mode. Preferably, an oscillating motion can be introduced via the actuator 7.

A further embodiment of an inventive valve 10 is illustrated in a lengthwise section and a cross-section in FIGS. 2A and 2B. The valve 10 consists of a hollow cylindrically embodied valve housing 11, in which a cylindrical element 12 is coaxially received. The valve housing 11 has therein a fluid inlet channel 13 and a fluid outlet channel 14 arranged at a spacing distance apart from each other in the lengthwise direction. The valve gap 15, through which the electrorheological fluid flows from the fluid inlet channel 13 to the fluid outlet channel 14, is bounded by two annular ring-shaped capacitor electrodes that are arranged spaced apart from each other with the valve gap 15 therebetween. The capacitor electrodes are formed on the one hand by the valve housing 11, which is connected to ground potential, and on the other hand by the cylindrical element 12, which is connected via an electrical line with a regulatable high voltage source. The valve housing 11 is formed with at least one lengthwise slit 16 extending therealong, which separates or cuts through the ring-shaped or annular sleeve-shaped valve housing 11.

By means of an actuator 17, which is only schematically illustrated, and which may similarly be activated according to piezoelectric, magnetic, hydraulic or magnetostrictive principles, the ring-shaped valve housing 11 embodied with the slit or slits 16 therein can be expanded or contracted by opening or closing the slit or slits 16, so that a controllable volume increase and reduction of the valve gap 15 can be introduced.

The valve 20 shown in a sectional view in FIG. 3 comprises a hollow cylindrical valve housing 21 with two disk-shaped lid members 22. Plural disk-shaped elements 24 are arranged parallel and spaced apart relative to each other via elastic ring-shaped intermediate elements 23 in the valve housing 21. The disk-shaped elements 24 each respectively comprise a cylindrical fluid through-flow opening 25 and are connected in series one after another in such a manner that the fluid through-flow openings 25 of the successive disk-shaped elements 24 are respectively arranged displaced or angularly offset from each other by 180°. The annular ring-shaped intermediate elements 23, for example, define a channel between successive ones of the elements 24, beginning from a fluid through-flow opening 25 of one disk-shaped element 24 and extending in a meandering pattern to a fluid through-flow opening 25 of the next disk-shaped element 24. The channel may alternatively be embodied with a spiral pattern. A further disk-shaped element 27 provided with a fluid through-flow opening 26 is embodied as an actuator and can be controlledly actuated to be movable along the direction of arrow 28 according to the piezoelectric, magnetic, hydraulic or magnetostrictive principles.

An electrorheological fluid that flows through the valve gap 29 between the disk-shaped elements that are arranged spaced apart and provided with fluid through-flow openings 25, can first be solidified in the flow mode by actuating or energizing the capacitor electrodes to generate an electric field therebetween. The capacitor electrode pairs are respectively formed by successive two disk-shaped elements 24 which are arranged spaced apart and parallel relative to each other, and which are alternately connected to ground potential or to a regulatable high voltage source. The intermediate elements 23 have an insulating effect. In order to increase the blocking pressure in the valve gap 29, the actuator 27 is now actuated in such a manner so that the respective spacing distance between the disk-shaped elements 24 relative to each other is reduced. The electrorheological fluid is now additionally transitioned into the squeeze mode.

Figure 4:
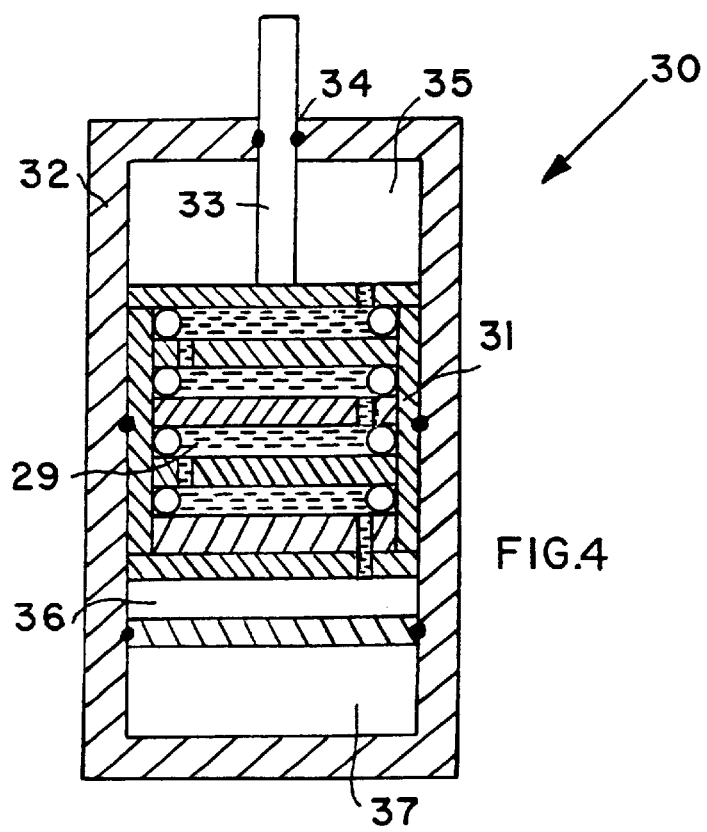
FIG. 4 shows a shock absorber with the electrorheological valve according to FIG. 3, in a sectional view.

FIG. 4 schematically shows a shock absorber 30 in a sectional view, wherein the valve 20 described in FIG. 3 forms the piston 31 of the shock absorber 30. The shock absorber 30 comprises a cylindrical housing 32 with an axially slidable piston 31 arranged therein. The piston 31 is connected to a piston rod 33 that is guided out of the housing 32 through a slide passage opening 34. The piston 31 separates from each other in the housing 32, two chambers 35 and 36, which are filled with an electrorheological fluid. Furthermore, a gas pressure chamber 37 is provided, which, among other things, serves for the compensation of the piston rod volume and the thermal volume variations of the electrorheological fluid. The chambers 35 and 36 are interconnected through the valve gap 29.

Figure 5:
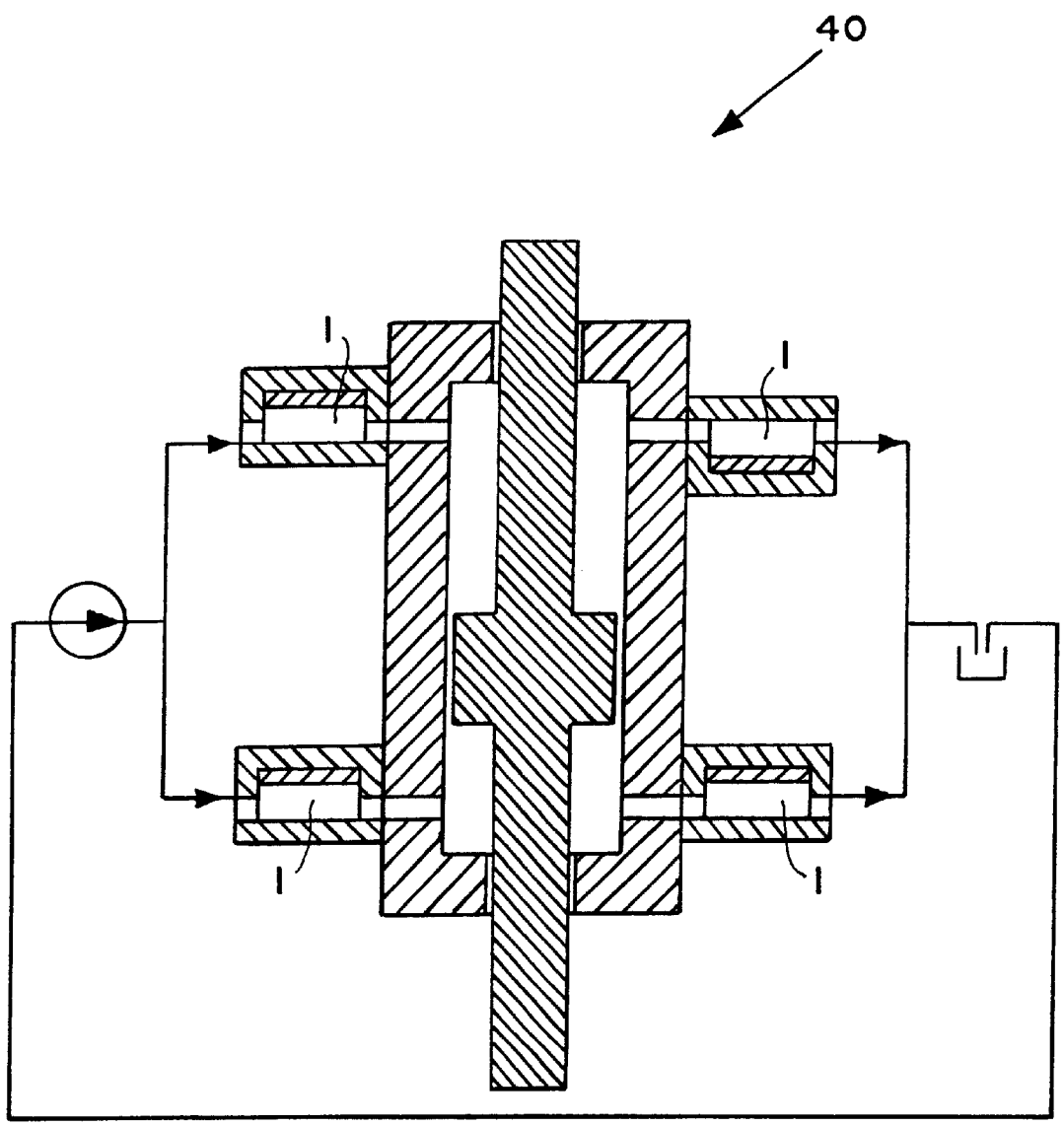
FIG. 5 shows an actuation control of a synchronous or double-acting cylinder.

In FIG. 5, a cylinder control of a synchronous or double-acting cylinder 40 is schematically illustrated. The valves on the fluid inlet and fluid outlet openings of the fluid chambers of the cylinder are embodied as electrorheological valves 1 according ing to the description of FIG. 1, FIG. 2A, FIG. 2B, or FIG. 3.

Figure 6:
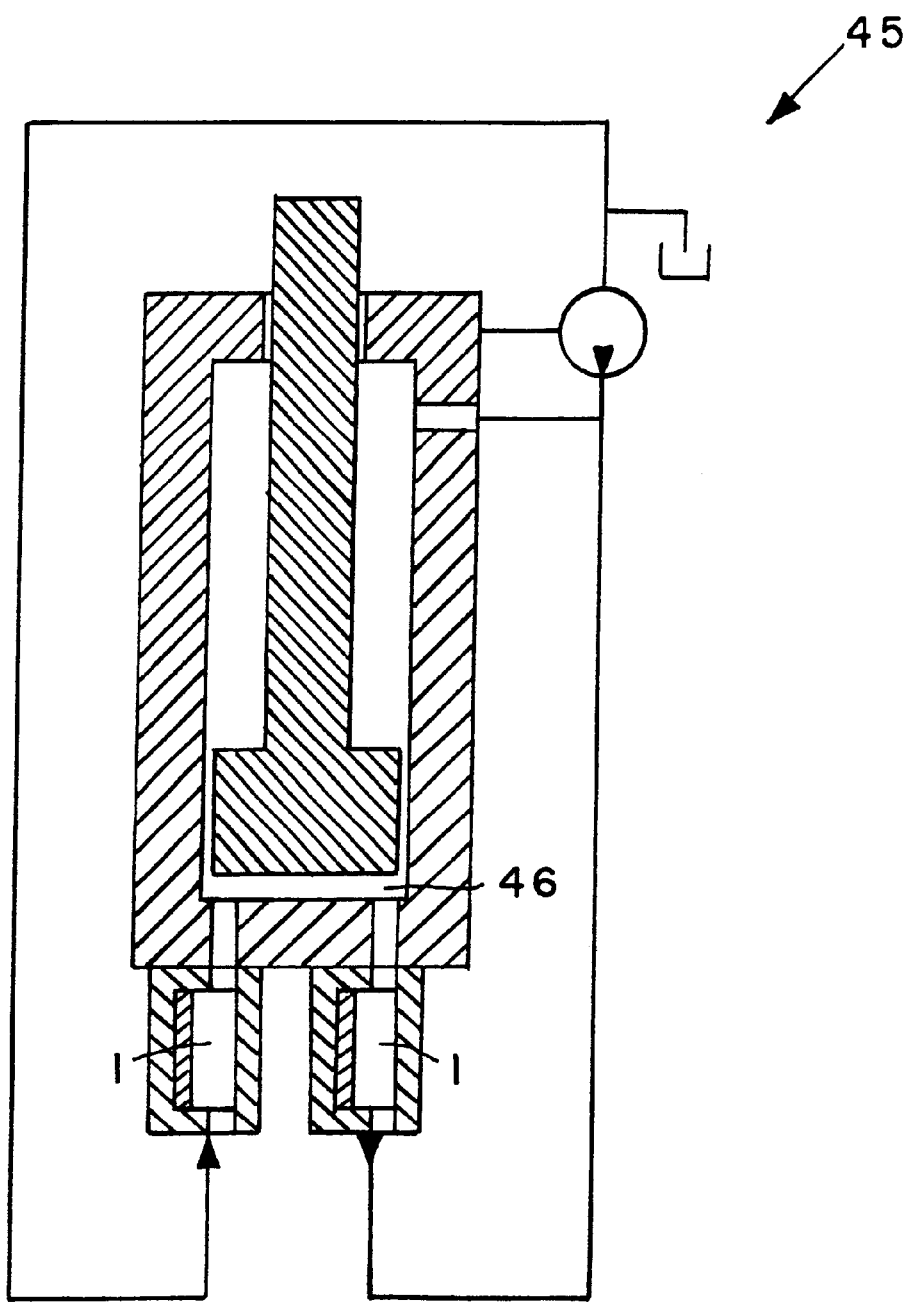
FIG. 6 shows an actuation control of a differential or single-acting cylinder.

In FIG. 6, a cylinder control of a differential or single-acting cylinder 45 is schematically illustrated. The valves on the fluid inlet and fluid outlet openings of the fluid chamber 46 are embodied as electrorheological valves 1 according to the description of FIG. 1, FIG. 2A, FIG. 2B or FIG. 3.

Figure 7:
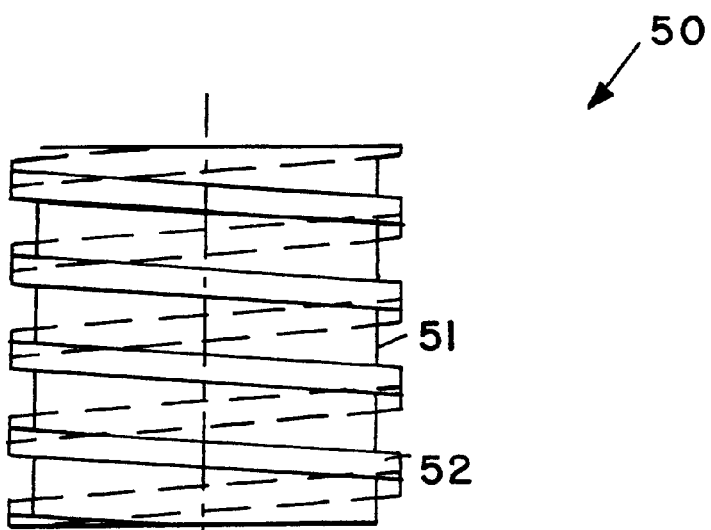
FIG. 7 shows a view of a valve base body of an electrorheological valve.

FIG. 7, in an elevational view, shows a cylindrical valve base body 50 that can be set into a hollow cylindrical valve housing. A strip-shaped element 52 of an insulating material having a round or rectangular cross-section is set onto the outer perimeter surface 51 of the cylindrical valve base body 50 in such a manner that the valve base body 50 is surrounded in a spiral pattern by the strip-shaped element 52. If now the valve base body 50 provided with the strip-shaped element 52 is set into a valve housing, thus is formed a valve with a spiral shaped valve gap running from a fluid inlet opening to a fluid outlet opening.

The valve housing is, for example, connected to ground potential, and the cylindrical valve base body is then connected to a regulatable high voltage source via electrical lines. Thus, an electrorheological fluid flowing through the valve gap can be solidified by appropriate actuation or energization of the capacitor field.

Figure 8:
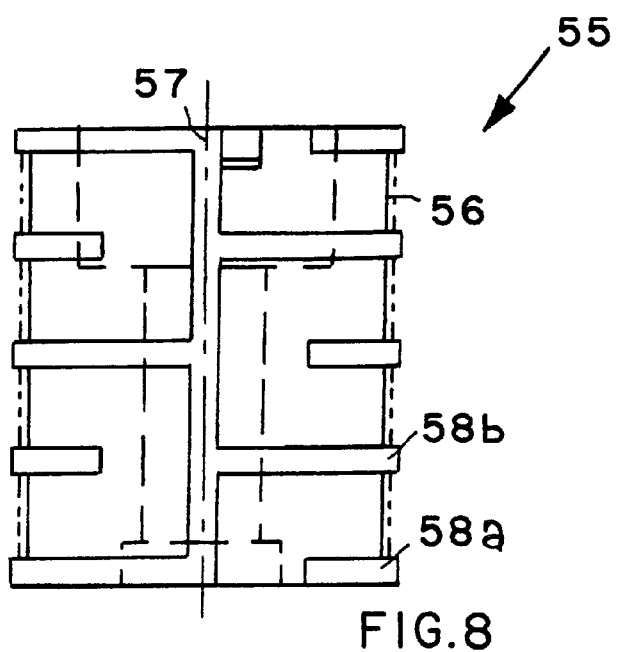
FIG. 8 shows a further example embodiment of a valve base body.

A further example embodiment of a cylindrical valve base body 55 is illustrated in FIG. 8. A strip-shaped element 57 running in the lengthwise direction is set onto the outer perimeter surface 56 of the valve base body. Beginning from this strip-shaped element 57, further strip-shaped elements 58A, 58B which are spaced apart and parallel relative to each other, are arranged in a cross-wise direction relative to the strip-shaped element 57, whereby the further strip-shaped elements 58A, 58B alternately beginning from a first side of the strip-shaped element 57 are set onto the outer perimeter surface of the valve base body 55, yet however end spaced apart from the second side of the strip-shaped element 57. A further strip-shaped element 58B arranged parallel and following thereon consecutively in the lengthwise direction is set onto the outer perimeter surface beginning from the second side of the strip-shaped element 57 and ends spaced apart from the first side of the strip-shaped element 57, etc. The strip-shaped elements 57, 58A and 58B are embodied of an insulating material. If now such a valve base body 55 provided with strip-shaped elements is inserted into a hollow cylindrical housing, thus is formed a valve with a meandering shaped valve gap running from a fluid inlet channel to a fluid outlet channel.

According to a preferred further embodiment that is not shown, it is provided that the valve base bodies according to FIG. 7 and FIG. 8 may be embodied to be slotted or slitted in a lengthwise direction therealong. By means of an actuator that can be controlledly actuated according to the piezoelectric, magnetic, hydraulic or magnetostrictive principles, the slotted or slitted valve base body can then be expanded or contracted, so that a volume variation of the valve gap can be introduced.

The valve base bodies according to the FIGS. 7 and 8 may similarly be utilized in a shock absorber as has already been described in FIG. 4.

Instead of the use of an electrorheological fluid, a magnetorheological fluid or a mixture of both electrorheological and magnetorheological fluids can alternatively be utilized. In the use of a magnetorheological fluid, electrically actuatable or energizable coil arrangements will be provided instead of the capacitor plate elements.

What is claimed is:
1. An arrangement including a fluid flow control valve and a fluid selected from the group consisting of electrorheological fluids, magnetorheological fluids and combinations thereof, wherein:
said valve comprises first and second bounding surfaces defining therebetween a valve gap that extends from a fluid inlet to a fluid outlet;
said fluid is in said valve gap;
at least one of said first and second bounding surfaces comprises an electrically energizable coil arrangement adapted to generate a magnetic field in said fluid in said valve gap, or said first and second bounding surfaces comprise electrically energizable capacitor electrodes adapted to generate an electric field in said fluid in said valve gap, so as to induce a flow mode rheological effect in said fluid; and
at least one of said first and second bounding surfaces is movable relatively toward and away from another of said first and second bounding surfaces so as to change a spacing distance between said first and second bounding surfaces that defines a width of said valve gap, so as to induce a squeeze mode rheological effect in said fluid.

2. The arrangement according to claim 1, wherein said fluid comprises said electrorheological fluid, said first and second bounding surfaces each comprise said capacitor electrodes, and said flow mode rheological effect and said squeeze mode Theological effect are simultaneously superimposed and induced in said electrorheological fluid.

3. The arrangement according to claim 1, wherein said fluid comprises said magnetorheological fluid, at least one of said bounding surfaces comprises said coil arrangement, and said flow mode Theological effect and said squeeze mode rheological effect are simultaneously superimposed and induced in said magnetorheological fluid.

4. The arrangement according to claim 1, wherein said valve further comprises a rectangular valve housing and an actuator arranged in said housing, said fluid inlet and said fluid outlet are respective holes in said housing, said valve housing includes said first bounding surface, said actuator includes said second bounding surface, and said actuator is supported in said housing so that said second bounding surface thereof is movable relatively toward and away from said first bounding surface in a direction perpendicular to a flow direction of said fluid through said valve gap.

5. The arrangement according to claim 1, wherein said valve further comprises:
a hollow cylindrical valve housing comprising a cylindrical shell housing wall that includes a cylindrical inner surface forming said first bounding surface and that has at least one slot extending lengthwise along and through said housing wall;
a cylindrical element that is arranged coaxially in said valve housing and that includes said second bounding surface; and
an actuator that is connected to said housing wall and adapted to selectively enlarge and reduce a width of said slot and thereby expand and contract said housing wall relative to said cylindrical element, whereby said first and second bounding surfaces are selectively movable relatively apart from one another and toward one another.

6. The arrangement according to claim 1, wherein said valve further comprises:
a hollow cylindrical valve housing extending along a cylinder axis;
a plurality of disk-shaped elements that each respectively have a fluid through-flow opening therethrough, that are arranged successively spaced axially apart from one another along said cylinder axis in said valve housing with said fluid through-flow openings of successive ones of said disk-shaped elements being angularly offset from one another respectively by 180° about said cylinder axis, and that each have first and second disk surfaces respectively comprising at least portions of said first and second bounding surfaces, with portions of said valve gap respectively defined between said first disk surface of one of said disk-shaped elements and said second disk surface of a next successive one of said disk-shaped elements; and
a disk-shaped actuator that is arranged parallel to and spaced axially apart from one of said disk-shaped elements on said cylinder axis, that includes an actuator surface arranged spaced axially apart from one of said disk surfaces of an adjacent one of said disk-shaped elements and defines a portion of said valve gap therebetween, and that is selectively movable relatively toward and away from said one of said disk surfaces of said adjacent one of said disk-shaped elements.

7. The arrangement according to claim 1, wherein said valve further comprises a valve housing and a piezoelectric actuator arranged in said valve housing so as to selectively move at least one of said first and second bounding surfaces relative to another of said first and second bounding surfaces.

8. The arrangement according to claim 1, wherein said valve further comprises a valve housing and a magnetostrictive actuator arranged in said valve housing so as to selectively move at least one of said first and second bounding surfaces relative to another of said first and second bounding surfaces.

9. The arrangement according to claim 1, wherein said valve further comprises a valve housing and a hydraulic actuator arranged in said valve housing so as to selectively move at least one of said first and second bounding surfaces relative to another of said first and second bounding surfaces.

10. The arrangement according to claim 1, wherein said valve further comprises a valve housing and an oscillating actuator arranged in said valve housing so as to selectively oscillatingly move at least one of said first and second bounding surfaces relative to another of said first and second bounding surfaces.

11. The arrangement according to claim 1, wherein said first and second bounding surfaces are so configured and arranged to bound said valve gap so as to define a flow path having a meandering pattern along said valve gap from said fluid inlet to said fluid outlet.

12. The arrangement according to claim 1, wherein said first and second bounding surfaces are so configured and arranged to bound said valve gap so as to define a flow path having a helical or spiral pattern along said valve gap from said fluid inlet to said fluid outlet.

13. The arrangement according to claim 1, wherein said arrangement is a shock absorber comprising a shock absorber housing, said valve arranged as a piston in said shock absorber housing, and a piston rod that is connected to said piston and that extends out of said housing.

14. The arrangement according to claim 1, wherein said arrangement is a controllable piston-cylinder arrangement comprising a cylinder, a piston arranged in said cylinder to separate two cylinder chambers from each other in said cylinder, and a piston rod that is connected to said piston and that extends out of said cylinder, wherein said valve is interposed in a fluid flow path connected to at least one of said cylinder chambers.

15. An arrangement including a fluid flow control valve and a fluid selected from the group consisting of electrorheological fluids, magnetorheological fluids and combinations thereof, wherein:
    said valve comprises first and second bounding surfaces defining therebetween a valve gap that extends from a fluid inlet to a fluid outlet;
    said fluid is in said valve gap;
    at least one of said first and second bounding surfaces comprises an electrically energizable coil arrangement adapted to generate a magnetic field in said fluid in said valve gap, or said first and second bounding surfaces comprise electrically energizable capacitor electrodes adapted to generate an electric field in said fluid in said valve gap, so as to induce a flow mode rheological effect in said fluid; and
    said first and second bounding surfaces are so configured and arranged to bound said valve gap so as to define a flow path having a meandering pattern along said valve gap from said fluid inlet to said fluid outlet.

16. The arrangement according to claim 15, wherein said valve further comprises:
    a hollow cylindrical valve housing extending along a cylinder axis; and
    a plurality of disk-shaped elements that each respectively have a fluid through-flow opening therethrough, that are arranged successively spaced axially apart from one another along said cylinder axis in said valve housing with said fluid through-flow openings of successive ones of said disk-shaped elements being angularly offset from one another respectively by 180° about said cylinder axis, and that each have first and second disk surfaces respectively comprising at least portions of said first and second bounding surfaces, with portions of said valve gap respectively defined between said first disk surface of one of said disk-shaped elements and said second disk surface of a next successive one of said disk-shaped elements.

17. The arrangement according to claim 15, wherein said arrangement is a shock absorber comprising a shock absorber housing, said valve arranged as a piston in said shock absorber housing, and a piston rod that is connected to said piston and that extends out of said housing.

18. The arrangement according to claim 15, wherein said arrangement is a controllable piston-cylinder arrangement comprising a cylinder, a piston arranged in said cylinder to separate two cylinder chambers from each other in said cylinder, and a piston rod that is connected to said piston and that extends out of said cylinder, wherein said valve is interposed in a fluid flow path connected to at least one of said cylinder chambers.

19. An arrangement including a fluid flow control valve and a fluid selected from the group consisting of electrorheological fluids, magnetorheological fluids and combinations thereof, wherein:
    said valve comprises first and second bounding surfaces defining therebetween a valve gap that extends from a fluid inlet to a fluid outlet;
    said fluid is in said valve gap;
    at least one of said first and second bounding surfaces comprises an electrically energizable coil arrangement adapted to generate a magnetic field in said fluid in said valve gap, or said first and second bounding surfaces comprise electrically energizable capacitor electrodes adapted to generate an electric field in said fluid in said valve gap, so as to induce a flow mode rheological effect in said fluid; and
    said first and second bounding surfaces are so configured and arranged to bound said valve gap so as to define a flow path having a helical or spiral pattern along said valve gap from said fluid inlet to said fluid outlet.

20. The arrangement according to claim 19, wherein said arrangement is a shock absorber comprising a shock absorber housing, said valve arranged as a piston in said shock absorber housing, and a piston rod that is connected to said piston and that extends out of said housing.

21. The arrangement according to claim 19, wherein said arrangement is a controllable piston-cylinder arrangement comprising a cylinder, a piston arranged in said cylinder to separate two cylinder chambers from each other in said cylinder, and a piston rod that is connected to said piston and that extends out of said cylinder, wherein said valve is interposed in a fluid flow path connected to at least one of said cylinder chambers.

* * * * *

UNITED STATES PATENT AND TRADEMARK OFFICE
CERTIFICATE OF CORRECTION

PATENT NO.    : 6,378,558 B1                                              Page 1 of 1
DATED         : April 30, 2002
INVENTOR(S)   : Pohl et la.

It is certified that error appears in the above-identified patent and that said Letters Patent is hereby corrected as shown below:

Title page,
Item [73], Assignee: after "Carl Schenck" add -- AG --;
Item [56], References Cited, U.S. PATENT DOCUMENTS, replace "Hartel et al." by -- Haertel et al. --;
OTHER PUBLICATIONS, after "neuer", replace "aktoren" by -- Aktoren --; and after "pp.", replace "48-16" by -- 48 - 61 --;

Column 4,
Line 43, after "according", delete -- ing --;

Column 6,
Line 5, after "mode", replace "Theological" by -- rheological --;
Line 10, after "mode", replace "Theological" by -- rheological --.

Signed and Sealed this

Twenty-fourth Day of September, 2002

Attest:

Attesting Officer

JAMES E. ROGAN
Director of the United States Patent and Trademark Office